United States Patent
Mochizuki

(10) Patent No.: US 10,209,418 B2
(45) Date of Patent: *Feb. 19, 2019

(54) ACHROMATIC POLARIZATION ELEMENT, AND POLARIZATION PLATE

(71) Applicants: Nippon Kayaku Kabushiki Kaisha, Tokyo (JP); Polatechno Co., Ltd., Niigata Prefecture (JP)

(72) Inventor: Noriaki Mochizuki, Tokyo (JP)

(73) Assignees: Nippon Kayaku Kabushiki Kaisha, Tokyo (JP); Polatechno Co., Ltd., Niigata Prefecture (JP)

( * ) Notice: Subject to any disclaimer, the term of this patent is extended or adjusted under 35 U.S.C. 154(b) by 547 days.

This patent is subject to a terminal disclaimer.

(21) Appl. No.: 14/781,714

(22) PCT Filed: Dec. 4, 2013

(86) PCT No.: PCT/JP2013/082625
§ 371 (c)(1),
(2) Date: Oct. 1, 2015

(87) PCT Pub. No.: WO2014/162633
PCT Pub. Date: Oct. 9, 2014

(65) Prior Publication Data
US 2016/0041322 A1   Feb. 11, 2016

(30) Foreign Application Priority Data

Apr. 3, 2013  (JP) .................... 2013-077962

(51) Int. Cl.
| | | |
|---|---|---|
| G02B 5/30 | (2006.01) | |
| C09B 45/28 | (2006.01) | |
| C09B 35/037 | (2006.01) | |
| G02B 1/08 | (2006.01) | |
| G02F 1/1335 | (2006.01) | |
| C09B 67/22 | (2006.01) | |

(52) U.S. Cl.
CPC .......... *G02B 5/3033* (2013.01); *C09B 35/037* (2013.01); *C09B 45/28* (2013.01); *C09B 67/0046* (2013.01); *G02B 1/08* (2013.01); *G02F 1/133528* (2013.01); *Y10T 428/1041* (2015.01)

(58) Field of Classification Search
CPC .............. B29D 11/00644; G02B 5/305; G02F 1/133528; C09B 31/08; C09B 35/037; C09B 45/28; C09B 56/04; C09B 67/0046; Y10T 428/1041
USPC ...................................... 428/1.31
See application file for complete search history.

(56) References Cited

U.S. PATENT DOCUMENTS

| | | | |
|---|---|---|---|
| 4,859,039 A * | 8/1989 | Okumura ............... | G02B 5/205 359/487.02 |
| 5,122,887 A * | 6/1992 | Mathewson ........ | G02F 1/13473 349/180 |
| 5,926,310 A | 7/1999 | Tamura et al. | |
| 6,235,064 B1 | 5/2001 | Ogino et al. | |
| 6,552,849 B1 | 4/2003 | Furuhashi et al. | |
| 6,606,136 B2 | 8/2003 | Matsumoto et al. | |
| 6,790,490 B1 | 9/2004 | Oiso et al. | |
| 7,931,072 B1 | 4/2011 | Kroliczek et al. | |
| 2002/0063243 A1 | 5/2002 | Matsumoto et al. | |
| 2003/0017326 A1* | 1/2003 | McGurran ............. | B32B 27/20 428/323 |
| 2004/0218118 A1 | 11/2004 | Hayashi | |
| 2007/0079740 A1 | 4/2007 | Sadamitsu et al. | |
| 2007/0166483 A1 | 7/2007 | Sadamitsu | |
| 2008/0094549 A1 | 4/2008 | Sadamitsu | |
| 2009/0046224 A1 | 2/2009 | Iida et al. | |
| 2009/0103013 A1* | 4/2009 | Taguchi ............... | G02B 5/3033 349/96 |
| 2009/0122235 A1* | 5/2009 | Aminaka .......... | G02F 1/133528 349/96 |
| 2011/0056863 A1* | 3/2011 | Sekiya ................. | A61K 9/7061 206/524.1 |
| 2011/0089383 A1 | 4/2011 | Sadamitsu et al. | |
| 2011/0091692 A1 | 4/2011 | Davidovits et al. | |
| 2012/0170117 A1* | 7/2012 | Cho ..................... | G02B 5/3033 359/487.01 |
| 2014/0085721 A1 | 3/2014 | Mochizuki et al. | |
| 2014/0218628 A1 | 8/2014 | Mochizuki | |

(Continued)

FOREIGN PATENT DOCUMENTS

| | | |
|---|---|---|
| JP | 60-156759 A | 8/1985 |
| JP | 64-5623 B2 | 1/1989 |

(Continued)

OTHER PUBLICATIONS

European communication dated Oct. 27, 2016 in co-pending European patent application No. 13881022.1.
Kinosei Shikiso no Oyo (Application of functional dye), First Edition, CMC Shuppan Co., Ltd., M. Irie, ed., p. 98-100, Jun. 27, 2002.
Senryo Kagaku (Chemistry of Dyes), Yutaka Hosoda, Gihodo Shuppan, Nov. 25, 1957.
International Search Report and Written Opinion dated Mar. 11, 2014 in co-pending PCT application No. PCT/JP2013/082627.
International Search Report and Written Opinion dated Mar. 11, 2014 in co-pending PCT application No. PCT/JP2013/082626.

(Continued)

*Primary Examiner* — Sophie Hon
(74) *Attorney, Agent, or Firm* — Nields, Lemack & Frame, LLC

(57) ABSTRACT a* and b* values, which define, the hue of a polarization element or a polarization plate using JIS.Z.8729, are adjusted such that the absolute value of the a* and b* values is: less than 1 during a single-body transmittance measurement; less than 2 when two sheets of a base material are arranged parallel, to the absorbing axis direction and the a* and b* values are measured; and less than 2 when two sheets of the base material are arranged orthogonal to the absorbing axis direction and the a* and b* values are measured.

14 Claims, No Drawings

(56) References Cited

U.S. PATENT DOCUMENTS

| | | |
|---|---|---|
| 2014/0218666 A1 | 8/2014 | Mochizuki |
| 2016/0041321 A1 | 2/2016 | Mochizuki |
| 2016/0047959 A1 | 2/2016 | Mochizuki |

FOREIGN PATENT DOCUMENTS

| | | | |
|---|---|---|---|
| JP | 6-337312 | A | 12/1994 |
| JP | 2622748 | B2 | 6/1997 |
| JP | 9-302250 | A | 11/1997 |
| JP | 11-218611 | A | 8/1999 |
| JP | 11-281817 | A | 10/1999 |
| JP | 2001-33627 | A | 2/2001 |
| JP | 2001-311827 | A | 11/2001 |
| JP | 2002-296417 | A | 10/2002 |
| JP | 3357803 | B2 | 12/2002 |
| JP | 2003-215338 | A | 7/2003 |
| JP | 2004-251962 | A | 9/2004 |
| JP | 2005-326713 | A | 11/2005 |
| JP | 3881175 | B2 | 2/2007 |
| JP | 2007-328324 | A | 12/2007 |
| JP | 4033443 | B2 | 1/2008 |
| JP | 2008-065222 | A | 3/2008 |
| JP | 4162334 | B2 | 10/2008 |
| JP | 4281261 | B2 | 6/2009 |
| JP | 2009-192577 | A | 8/2009 |
| JP | 4452237 | B2 | 4/2010 |
| JP | 4662853 | B2 | 3/2011 |
| JP | 2011-197600 | A | 10/2011 |
| JP | 4825135 | B2 | 11/2011 |
| JP | 2012-3172 | A | 1/2012 |
| JP | 2013-57909 | A | 3/2013 |
| JP | 2013-57910 | A | 3/2013 |
| JP | 2013-174786 | A | 9/2013 |
| WO | 2007/138980 | A1 | 12/2007 |
| WO | 2007/148757 | A1 | 12/2007 |
| WO | 2009/142192 | A1 | 11/2009 |
| WO | 2009/156784 | A1 | 12/2009 |
| WO | 2012/165223 | A1 | 12/2012 |

OTHER PUBLICATIONS

International Search Report and Written Opinion dated Mar. 11, 2014 in corresponding PCT application No. PCT/JP2013/082625.
Office action dated Jan. 25, 2018 in co-pending U.S. Appl. No. 14/781,699.
Office action dated Jan. 24, 2018 in co-pending U.S. Appl. No. 14/781,691.
Final rejection dated Aug. 6, 2018 in co-pending U.S. Appl. No. 14/781,699.
Final rejection dated Aug. 6, 2018 in co-pending U.S. Appl. No. 14/781,691.
Notice of allowance dated Oct. 19, 2018 in co-pending U.S. Appl. No. 14/781,699.
Notice of allowance dated Oct. 19, 2018 in co-pending U.S. Appl. No. 14/781,691.

* cited by examiner

ACHROMATIC POLARIZATION ELEMENT, AND POLARIZATION PLATE

TECHNICAL FIELD

The present invention relates to a dye-based polarization element, and to a polarization plate.

BACKGROUND ART

Typically, a polarization element is manufactured by orienting iodine or a dichroic dye as dichroic pigments on a polyvinyl alcohol resin film by adsorption. A protective film comprising triacetyl cellulose or the like is adhered, via an adhesive layer, to at least one surface of the polarization element to give a polarization plate, which is used in a liquid crystal display device or the like. A polarization plate that employs iodine as the dichroic pigment is called an iodine-based polarization plate, while a polarization plate that employs a dichroic dye as the dichroic pigment is called a dye-based polarization plate. Of these, dye-based polarization plates have high heat resistance, high durability against heat and humidity, and high stability, and also feature wide color selection through blending; on the other hand, there is a problem in that a polarization plate having the same degree of polarization as an iodine-based polarization plate will have comparatively lower transmittance, i.e. lower contrast. Accordingly, there is a desire for a polarization plate that maintains high durability, while offering a wide selection of colors, as well as having higher transmittance and high polarization characteristics. However, even with such dye-based polarization plates that offer a wide selection of colors, the polarization elements to date have been ones that, when it is attempted to arrange polarization elements parallel to the absorption axis to produce white, instead emit a yellowish tinge. When, in order to ameliorate the yellowish tinge encountered with the parallel arrangement, a polarization plate designed to minimize the yellowish tinge encountered with the parallel arrangement is fabricated, a resultant problem is that, when the polarization element is arranged on an orthogonal axis with respect to the absorption axis, black appears as blue. Therefore, while there is a need, as a polarization element, for a polarization plate that expresses achromatic white when white color is to be displayed, and that expresses achromatic black when black color is to be displayed, no polarization element or polarization plate has been capable of expressing achromatic white when displaying white, and achromatic black when displaying black, at single transmittance of 35% or above.

PRIOR ART REFERENCES

Patent References

Patent Reference 1: Japanese Patent No. 4281261
Patent Reference 2: Japanese Patent No. 3357803

Non-Patent References

Non-Patent Reference 1: Kinosei Shikiso no Oyo (Application of functional dye), First Edition, CMC Shuppan Co., Ltd., M. Irie, ed, p. 98-100

SUMMARY OF THE INVENTION

Problems to be Solved by the Invention

Techniques such as those of Patent Reference 1 or Patent Reference 2 have been disclosed by way of methods for improving the hue of polarization plates. In Patent Reference 1, there is disclosed a polarization plate for which a neutral coefficient is calculated, the absolute value being from 0 to 3; however, from the working examples it is understood that, notwithstanding the low neutral coefficient (Np), for the parallel hue calculated from JIS Z 8729, the a* value is from −2 to −1, and the b* value is from 2.5 to 4.0, and therefore when white is to be expressed, the color appears as a greenish yellow color. For the orthogonal hue, the a* value is from 0 to 1, and the b* value is from −1.5 to −4.0, and therefore the polarization plate presents a blue color. In Patent Reference 2, there is disclosed a polarization element, the average value of transmittance at 410 nm to 750 nm of which is adjusted to no more than ±30% by adding, in addition to iodine, a direct dye, reactive dye, or acid dye. However, the polarization element obtained thereby has single transmittance, that is, the polarization element has the color when measured using only a single polarization element, such that the a value and the b value in the UCS color space have absolute values no more than 2. Thus, the element is not able co simultaneously express as achromatic color the hues produced during white display (when parallel) and black display (when orthogonal), with use of two polarization plates. As may be seen from the working examples, the single transmittance in Working Example 1 is 31.95%, and that in Working Example 2 is 31.41%; due to this low transmittance, the element does not have satisfactory performance, in terms of higher transmittance and higher degree of polarization, in fields where high transmittance and high contrast are required, particularly liquid crystal display devices, organic electroluminescence, and similar fields.

Means Used to Solve the Above-Mentioned Problems

As a result of extensive study directed to solving the aforementioned problem, the inventors made the novel discovery that a polarization element having a single transmittance of 35% or above, where a single body is a base material containing a dichroic dye of iodine and an azo compound, the polarization element being characterized in that the a* value and the b* value calculated in accordance with JIS Z 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2, affords a polarization element or polarization plate that, while having high transmittance, is capable of expressing achromatic white when the absorption axis of the polarization element is arranged in parallel, and capable of expressing achromatic black when the absorption axis of the polarization element is arranged orthogonally.

Specifically, the present invention relates to:

"(1) A polarization element comprising a base material containing iodine and an azo compound and having a polarizing function, wherein the polarization element is characterized in that a* value and b* value of hue calculated in accordance with JIS Z 8729 are such that absolute values of the a* value and the b* value when single transmittance is measured are no more than 1, absolute values of the a* value and the b* value measured with two of the base materials being arranged in parallel with respect to an absorption axis direction are no more than 2, absolute values of the a* value and the b* value measured with two of the base materials being arranged orthogonally with respect to the absorption axis direction are no more than 2, and the single transmittance is 35% or above.

(2) The polarization element according to (1), characterized in that a polarization degree is 99% or above.

(3) The polarization element according to (1) or (2), characterized in that: transmittance of individual wavelengths during irradiation with polarized light, an absolutely polarized form of which having a vibration direction orthogonal to the absorption axis direction of a base material polarization element, is such that difference between average transmittance at 550 nm to 600 nm and average transmittance at 400 nm to 460 nm is no more than 4%, and difference between average transmittance at 600 nm to 670 nm and average transmittance at 550 nm to 600 cm is no more than 3%; and transmittance of individual wavelengths during irradiation with polarized light, an absolutely polarized form of which has a vibration direction parallel to the absorption axis direction of the base material polarization element, is such that difference between average transmittance at 550 nm to 600 nm and average transmittance at 400 nm to 460 nm is no more than 1%, and difference between average transmittance at 600 nm to 670 nm and average transmittance at 550 nm to 600 nm is no more than 1%.

(4) The polarization element according to any of (1) to (3), characterized in that the azo compound contains, in a form of a free acid, an azo compound represented by formula (1) and an azo compound represented by formula (2); or an azo compound represented by formula (1) and an azo compound represented by formula (3):

[Chemical formula 1]

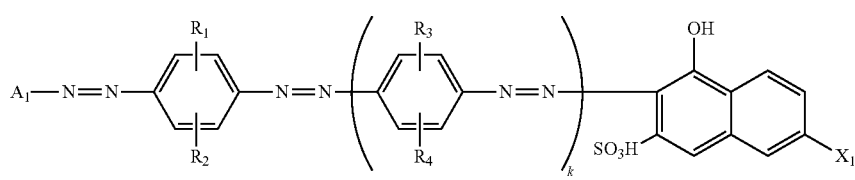

Formula (1)

[Chemical formula 2]

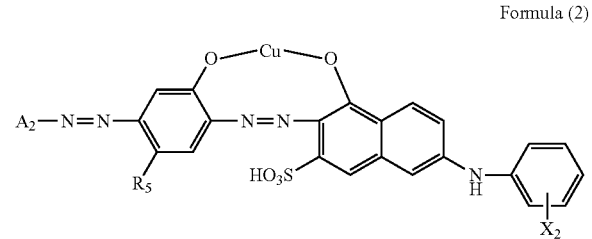

Formula (2)

(wherein $A_1$ represents a phenyl group or naphthyl group having a substituent group; $R_1$ to $R_4$ each independently represent a hydrogen atom, a lower alkyl group, a lower alkoxy group, a sulfa group, or a lower alkoxy group having a sulfo group; $X_1$ represents an amino group optionally having a substituent group, a henzoylamino group optionally having a substituent group, a phenylamino group optionally having a substituent group, or a phenylazo group optionally having a substituent group; k represents an integer of 0 or 1; and when k is 1, $X_1$ represents a benzoylamino group optionally having a substituent group.)

(wherein $A_2$ represents a phenyl group or naphthyl group having a substituent group; $R_5$ represents a hydrogen atom, a lower alkyl group, a lower alkoxy group, a sulfa group, or a lower alkoxy group having a sulfa group; and $X_2$ represents a hydrogen atom, a lower alkyl group, or a lower alkoxyl group.)

[Chemical formula 3]

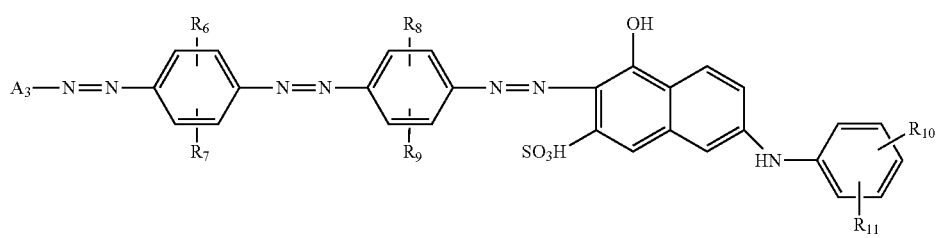

Formula (3)

(wherein $A_3$ represents a phenyl group having a substituent group; $R_6$ to $R_9$ each independently represent a hydrogen atom, a lower alkyl group, a lower alkoxy group, a sulfa group, or a lower alkoxy group having a sulfa group; and $R_{10}$ and $R_{11}$ each independently represent a hydrogen atom, a methyl group, a methoxy group, a sulfo group, an amino group, or a substituted amino group, with the proviso that all of $R_6$ to $R_9$ do not represent lower alkoxy groups simultaneously.).

(5) The polarization element according to (4), characterized in that $X_1$ of formula 1 is represented by formula (4):

[Chemical formula 4]

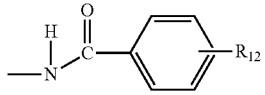

Formula (4)

(wherein $R_{12}$, represents a hydrogen atom, a methyl group, a methoxy group, a sulfa group, or an amino group).

(6) The polarization element according to (4), characterized in that $X_1$ of formula 1 is represented by formula (5):

[Chemical formula 5]

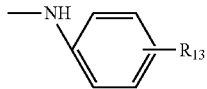

Formula (5)

(wherein represents a hydrogen atom, a methyl group, a methoxy group, a sulfo group, or an amino group).

(7) The polarization element according to any of (4) to (6), characterized in that $R_5$ of formula (2) is a methyl group or a methoxy group.

(8) The polarization element according to any of (4) to (7), characterized in that $A_2$ of formula (2) is a naphthyl group having a substituent group.

(9) The polarization element according to (8), characterized in that $X_2$ of formula (2) is a hydrogen atom, a methyl group, or a methoxy croup.

(10) The polarization element, according to any of (4) to (6), characterized in that at least one of $R_8$ and $R_9$ of formula (3) is a methoxy croup.

(11) The polarization element, according to any of (4) to (6) and (11), characterized in that at least one of $R_6$ and $P_7$ of formula (3) is a methoxy group.

(12) The polarization element according to any of (1) to (11), characterized in that the base material comprises a polyvinyl alcohol resin film.

(13) The polarization plate according to any of (1) to (12), wherein a support film is furnished to at least one surface of the polarization element.

(14) A liquid crystal display device comprising the polarization element or polarization plate according to any of (1) to (13)."

Advantages of the Invention

The polarization element of the present invention, while having high transmittance, is capable of expressing achromatic white when the absorption axes of the polarization elements are arranged in parallel, and capable of expressing achromatic black when the absorption axes of the polarization elements are arranged orthogonally.

BEST MODE FOR CARRYING OUT THE INVENTION

The polarization element of the present invention, in one aspect thereof, is a polarization element comprising a base material that contains a dichroic dye of iodine and an azo compound, characterized in that the a* value and the b* value of hue calculated in accordance with JIS Z 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, the absolute values of the a* value and the b* value measured with two of the base materials being arranged orthogonally with respect to the direction of the absorption axis are no more than 2, and the single transmittance is 35% or above. The object color display method specified in JIS Z 8729 is equivalent to the object color display method specified by the International Commission on Illumination (abbreviated CIE). Single-body transmittance indicates the transmittance observed when transmittance is measured from one (a single) polarization element while natural light is directed thereon; it is necessary that the hue observed during measurement of single transmittance be such that the a* value (hereinafter denoted as a*-s) and the b* value (hereinafter denoted as b*-s), expressed as absolute values, are 1 or less. Moreover, a polarization plate that can express achromatic color can be realized where, with natural light being incident thereon, the absolute values of the a* value (hereinafter denoted as a*-p) and the b* value (hereinafter denoted as b*-p) measured with two base materials being arranged in parallel with respect to the direction of the absorption axis are no more than 2, and where, with natural light being incident thereon, the absolute values of the a* value (hereinafter denoted as a*-c) and the b* value (hereinafter denoted as a*-c) measured with two base materials being arranged orthogonally with respect to the direction of the absorption axis are no more than 2. In preferred practice, the absolute values of a*-p and b*-p are no more than 1.5, and the absolute values of a*-c and b*-c are no more than 1.5; and more preferably the absolute values of a*-p and b*-p are no more than 1.0, and the absolute values of a*-c and b*-c are no more than 1.0. Humans can perceive a difference in color as small as an absolute value of 0.5 between the absolute values of a*-p and b*-p, and it is therefore extremely important to control the numerical values in particular, where the absolute values of a*-p and b*-p are no more than 1, the polarization plate will be good enough that it is substantially impossible to distinguish the appearance of color, when the color is substantially white, or when black.

While high transmittance and a high degree of polarization are required as capabilities of a polarization plate, provided that the single transmittance of the plate is 35%, ample brightness can be expressed even when employed in a display device; a level of 38% or above is preferred, with 39% or above being more preferred, and 40% or above being especially preferred. Where the degree of polarization is 99% or above, polarizing capability as a display device can be expressed. However, currently, there is a need for even higher-contrast polarization plates, and there being a need for polarization plates more preferably having a degree of polarization of 99.9% or above, and more preferably 99.95% or above.

Such a polarization element characterized in that the a* value and the b* value calculated in accordance with JIS 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, the absolute values of the a* value and the b* value measured with two of the base materials being arranged orthogonally with respect to the direction of the absorption axis are no more than 2, and the sin(le transmittance is 35% or above, can be realized by including in the base material a dichroic dye comprising iodine and an azo compound.

The base material is a film produced from a hydrophilic polymer capable of containing iodine or a dichroic dye that is an azo compound. Examples of the hydrophilic polymer includes, but not limited to, polyvinyl alcohol resins, amylose resins, starch based resins, cellulose resins, polyacrylate resins, and the like. When a dichroic dye is to be contained, polyvinyl alcohol resins and resins comprising derivatives thereof are most desirable due to properties such as processability, dye affinity, crosslinkability, and the like. A polarization element or polarization plate can be fabricated by forming the resins into a film, compounding the film with a dye of the present invention and a blend thereof, and applying an orientation process such as stretching.

As dichroic dyes comprising azo compounds, organic compounds such as those indicated, e.g., in Non-Patent Reference 1, can be used. In particular, highly dichroic dies are especially preferred. Examples of such compounds include C.I. Direct Yellow-12, C.I. Direct Yellow-28, C.I. Direct Yellow-44, C.I. Direct Orange 26, C.I. Direct Orange 39, C.I. Direct Orange 107, C.I. Direct Red 2, C.I. Direct Red 31, C.I. Direct Red 79, C.I. Direct Red 81, C.I. Direct Red 247, C.I. Direct. Green 80, C.I. Direct Green 59, and the organic dyes disclosed in Japanese Laid-Open Patent. Application 2001-33627, Japanese Laid-Open Patent Application 2002-296417, and Japanese Laid-Open Patent. Application 60-156759. These organic dyes can be used in the form of free acids, or of alkali metal salts (e.g., Na, K, or Li salts), ammonium salts, or amine salts. However, the dichroic dyes are not limited, to these, and any of the known dichroic dyes can be employed. The optical characteristics are particularly improved where the azo compound is a free acid, salt thereof, or copper complex salt dye thereof. It is acceptable to employ a single type of azo compound, or to employ blends with other azo compounds, with no limitation as to the blend. By employing such a dichroic pigment, and adjusting the transmittance of the polarization element, it is possible to attain a polarization element characterized in that the a* value and the b* value calculated in accordance with JIS Z 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, the absolute values of the a* value and the b* value measured with two of the base materials being arranged orthogonally with respect to the direction of the absorption axis are no more than 2, and the single transmittance is 35% or above.

The polarization element can be realized by controlling the transmittance thereof at individual wavelengths, the polarization element, being characterized in that the a* value and the b* value calculated in accordance with JIS Z 8729 are such that the absolute values of the a* value and the b* value, when single transmittance is measured are no more than 1, the absolute values of the a* value and the b* value measured with two of the base materials being arranged in parallel with respect to the direction of the absorption axis are no more than 2, the absolute values of the a* value and the b* value measured with two of the base materials being arranged orthogonally with respect to the direction of the absorption axis are no more than 2, and the single transmittance is 35% or above. One control method by which such an element may be realized involves controlling the transmittance of individual wavelengths during irradiation with polarized light, the substantially 100% polarized form of which (hereinafter, absolutely-polarized light) having a vibration direction that is orthogonal to the absorption axis direction of the base material (polarization element), in such a way that the difference between the average transmittance at 550 nm to 600 nm and the average transmittance at 400 nm to 460 nm is no more than 4%, and the difference between the average transmittance at 600 nm to 670 nm and the average transmittance at 550 nm to 600 nm is no more than 3%; and further, in such a way the transmittance of individual wavelengths during irradiation with polarized light, the absolutely polarized form of which having a vibration direction parallel to the absorption axis direction of the base material polarization element, is such that the difference between the average transmittance at 550 nm to 600 nm and the average transmittance at 400 nm to 460 nm is no more than 1%, and the difference between the average transmittance at 600 nm to 670 nm and the average transmittance at 550 nm to 600 nm is no more than 1%. In preferred practice, the transmittance of individual wavelengths during irradiation with polarized light, the absolutely polarized form of which having a vibration direction orthogonal to the absorption axis direction of the base material (polarization element), will, be controlled such that the difference between the average transmittance at 550 nm to 600 nm and the average transmittance at 400 nm to 460 nm is no more than 3.5%, and the difference between the average transmittance at 600 nm to 670 nm and the average transmittance at 550 nm to 600 nm is no more than 2.5%; still more preferably, the transmittance of individual wavelengths during irradiation with polarized light, the absolutely polarized form of which having a vibration direction orthogonal to the absorption axis direction of the base material (polarization element), will be controlled such that the difference between the average transmittance at 550 nm to 600 nm and the average transmittance at 400 nm to 460 nm is no more than 3.0%, and the difference between the average transmittance at 600 nm to 670 nm and the average transmittance at 550 nm to 600 nm is no more than 2.0%.

By including, as the dichroic pigment, a pigment that when employed concomitantly with iodine is effective in controlling wavelengths such that the a* value and the b* value calculated in accordance with JIS Z 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, the absolute values of the a* value and the b* value measured with two of the base materials being arranged orthogonally with respect to the direction of the absorption axis are no more than 2, in which pigment the dichroic dye contains, in the form of a free acid, an azo compound represented by formula (1), and additionally contains an azo compound represented by formula (2) or an azo compound represented by formula (3), there can be realized a polarization plate that, in addition to being able to produce achromatic hues, has high transmittance and a high degree of polarization. That is, such polarization plate can be realized either through a combination of iodine, an azo compound represented by formula (1), and an azo compound represented by formula (2); or a combination of iodine, an azo compound represented by formula (1), and an azo compound represented by formula (3). The combination of iodine, an azo compound represented by formula (1), and an azo compound represented by formula (2) would be acceptable for obtaining a more highly-transmissive polarization element capable of exhibiting achromatic white and black. The combination of iodine, an azo compound represented by formula (1), and an arc compound represented by formula (3) would be acceptable for the purposes of obtaining not only a highly-transmissive polarization element expressing achromatic white and black, but also a polarization plate having an even higher degree of polarization.

[Chemical formula 6]

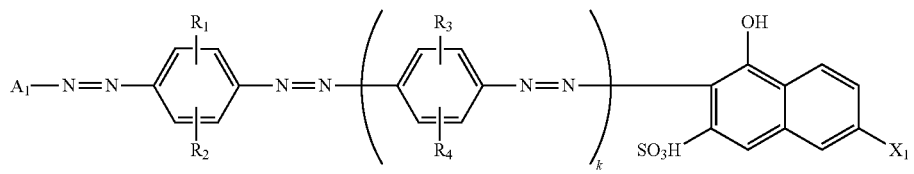

Formula (1)

(wherein $A_1$ represents a phenyl group or naphthyl group having a substituent group; $R_1$ to $R_4$ each independently represent a hydrogen to a lower alkyl group, a lower alkoxy group, a sulfo group, or a lower alkoxy group having a sulfa group; $X_1$ represents an amino group optionally having a substituent group, a benzoylamino group optionally having a substituent group, a phenylamino group optionally having a substituent group, or a phenylazo group optionally having a substituent group; k represents an integer of 0 or 1; and when k is 1, $X_1$ represents a benzoylamino group optionally having a substituent group.)

[Chemical formula 7]

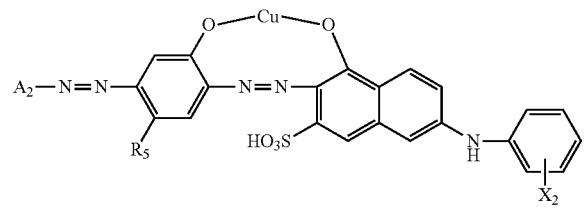

Formula (2)

(wherein $A_2$ represents a phenyl group or naphthyl group having a substituent group; $R_5$ represents a hydrogen atom, a lower alkyl group, a lower alkoxy group, a sulfa group, or a lower alkoxy group having a sulfo group; and $X_2$ represents a hydrogen atom, a lower alkyl group, or a lower alkoxyl group.)

[Chemical formula 8]

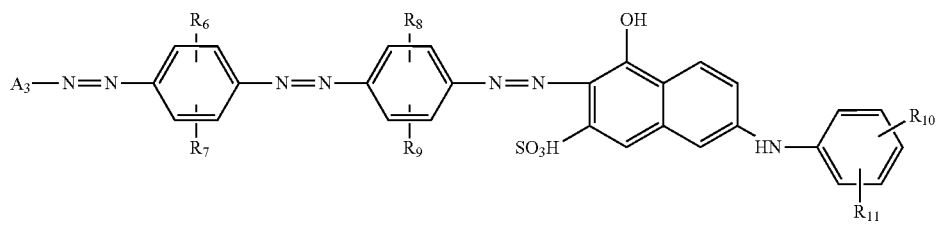

Formula (3)

(wherein $A_3$ represents a phenyl group having a substituent group; $R_6$ to $R_9$ each independently represent a hydrogen atom, a lower alkyl group, a lower alkoxy group, a sulfa group, or a lower alkoxy group having a sulfa group; and $R_{10}$ and $R_{11}$ each independently represent a hydrogen atom, a methyl group, a methoxy group, a sulfo group, an amino group, or a substituted amino group, with the proviso that all of $R_6$ to $R_9$ do not represent lower alkoxy groups aimultaneously.)

A polarization element, of higher capabilities can be obtained where $X_1$ of formula (1) has a substituent group represented by formula (4), in order to produce a highly-transmissive polarization element having a higher degree of polarization. $R_1$ and $R_2$ are preferably hydrogen atoms or amino groups, and more preferably amino groups in particular, when k is 1, $X_1$ represents a benzoylamino group optionally having a substituent group, the preferred substituent group being a hydrogen atom or amino group; in particular, a benzoylamino group having an amino group is more preferred.

[Chemical formula 9]

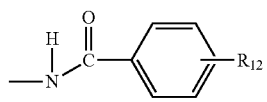

Formula (4)

(wherein $R_{12}$ represents a hydrogen atom, a methyl group, a methoxy group, a sulfo group, or an amino group)

A polarization element of higher capabilities can be obtained where $X_1$ of formula (1) has a substituent group represented by formula (5), in order to produce a highly-transmissive polarization element having a higher degree of polarization, and exhibiting achromatic white and black is preferably a hydrogen atom, a methyl group, or a methoxy group, and more preferably a hydrogen atom.

[Chemical formula 10]

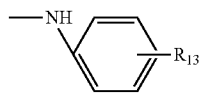

Formula (5)

(wherein $R_{13}$ represents a hydrogen atom, a methyl group, a methoxy group, a sulfa group, or an amino group)

The azo compounds represented by formula (1) can be produced by the methods disclosed in Japanese Laid-Open Patent Application 2003-215338, Japanese Laid-Open. Patent Application 9-302250, Japanese Patent Publication 3881175, Japanese Patent Publication 4452237, Japanese Patent Publication 4662853, and the like; however, there is no limitation thereto.

$R_5$ of the azo compounds represented by formula (2) represents a hydrogen atom, a lower alkyl group, a lower alkoxy group, a sulfo group, or a lower alkoxy group having a sulfo group; however, in terms of achieving higher transmittance, a high degree of polarization, and achromatic white and achromatic black, it is preferable for $R_5$ to be a methyl group or a methoxy group.

$A_2$ of the azo compounds represented by formula (2) represents a phenyl group or naphthyl group having a substituent group; in terms of achieving higher transmittance, a high degree of polarization, and achromatic white and achromatic black, it is preferable for $A_5$ to be naphthyl group having a substituent group.

$X_2$ of the azo compounds represented by formula (2) represents a hydrogen atom, a lower alkyl group, or a lower alkoxyl group. In terms of achieving higher transmittance, a high degree of polarization, and achromatic white and achromatic black, it is preferable for $X_2$ to be a hydrogen atom, or a lower alkyl group such as a methyl group or methoxy group.

The azo compounds represented by formula (2) can be produced by the method disclosed, e.g., in Japanese Examined. Patent Application 01-005623; however, there is no limitation thereto.

In $A_3$ of the azo compounds represented by formula (3), $A_3$ represents a phenyl group having a substituent group; and the substituent group includes a hydrogen atom, a lower alkyl group, a lower alkoxy group, a sulfa group, a lower alkoxy group having a sulfa group, and a carbonyl group. However, a sulfo group, a methyl group, a methoxy group, or a carbonyl group is preferred as the substituent group for achieving higher transmittance, a high degree of polarization, and achromatic white and achromatic black. The number of substituent groups may be one, or two or more. In the case where two or more substituent groups are contained, the combination of the substituent groups may include, but are not limited to, combination containing a plurality of identical substituent groups, and different substituent groups may be contained. For example, it would be possible to select a combination such that one substituent group is a sulfo group, and the other substituent group is a carbonyl group.

In $R_6$ to $R_9$ of the azo compounds represented by formula (3), $R_6$ to $R_9$ each independently represent a hydrogen atom, a lower alkyl group, a lower alkoxy group, a sulfo group, or a lower alkoxy group having a sulfa group; however, in terms of achieving higher transmittance, a high degree of polarization, and achromatic white and achromatic black, it is preferable for at least one of $R_8$ and $R_9$ to be a methoxy group. More preferable still, at least one of $R_6$ and $R_7$ will be a methoxy group. However, it is not preferable that all of $R_6$ to $R_9$ represent lower alkoxy groups simultaneously, as this will lead to inability to express achromatic white and achromatic black.

In $R_{10}$ and $R_{11}$ of the azo compounds represented by formula (3), $R_{10}$ and $R_{11}$ each independently represent a hydrogen atom, a methyl group, a methoxy group, a sulfo group, an amino group, or a substituted amino group; however, in terms of achieving higher transmittance, a high degree of polarization, and achromatic white and achromatic black, it is preferable for at least one of $R_{10}$ and $R_{11}$ to be a hydrogen atom, a methyl group, or a methoxy group.

The azo compounds represented by formula (3) can be produced by the methods disclosed in Japanese Patent. Publication 2622748, Japanese Patent Publication 4825135, WO 2007/148757, or WO 2009/142192 A1; however, there is no limitation thereto.

Specific examples of azo compounds represented by formula (1) include C.I. Direct Red 81, C.I. Direct Red 117, C.I. Direct Red 127, and the dyes disclosed in Japanese Patent Publication 3881175, Japanese Patent Publication 4033443, Japanese Patent. Publication 4162334, Japanese Patent Publication 4452237, Japanese Patent Publication 4662853, and the like.

More specific examples of azo compounds represented by formula (1) are given below, in the form of a free acid.

COMPOUND EXAMPLE 1

[Chemical formula 11]

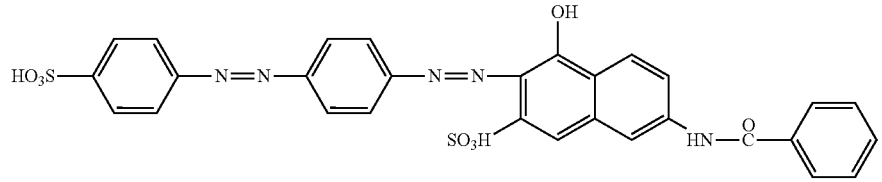

COMPOUND EXAMPLE 2

[Chemical formula 12]

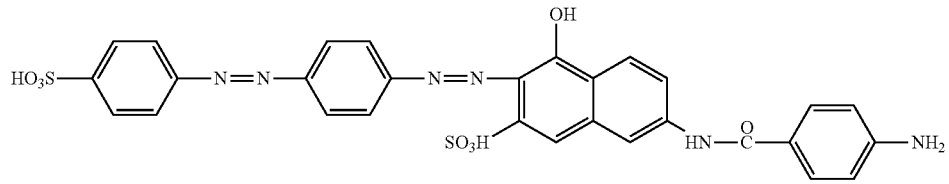

COMPOUND EXAMPLE 3
[Chemical formula 13]
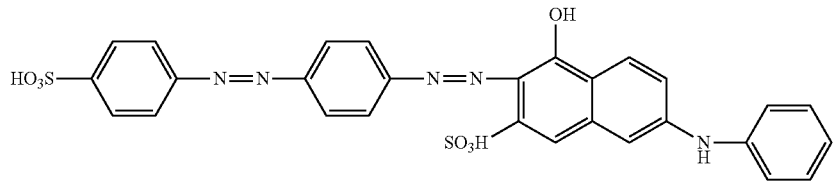
COMPOUND EXAMPLE 4
[Chemical formula 14]
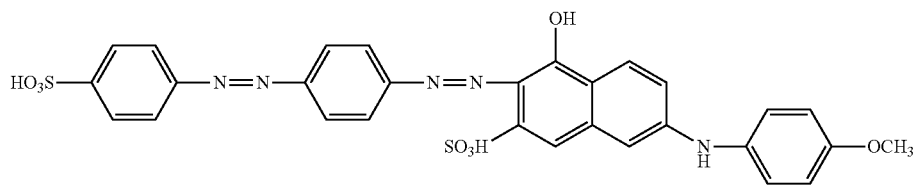
COMPOUND EXAMPLE 5
[Chemical formula 15]
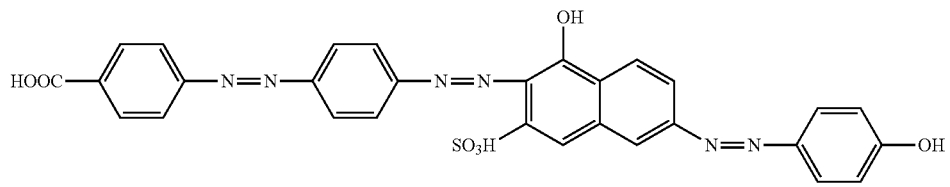
COMPOUND EXAMPLE 6
[Chemical formula 16]
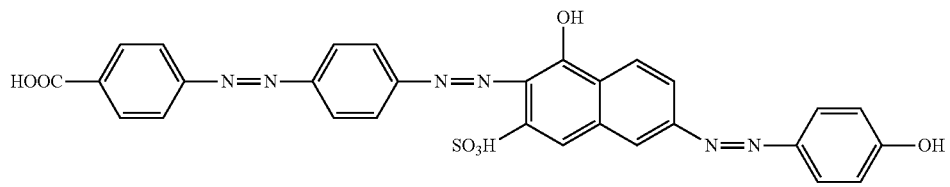
COMPOUND EXAMPLE 7
[Chemical formula 17]
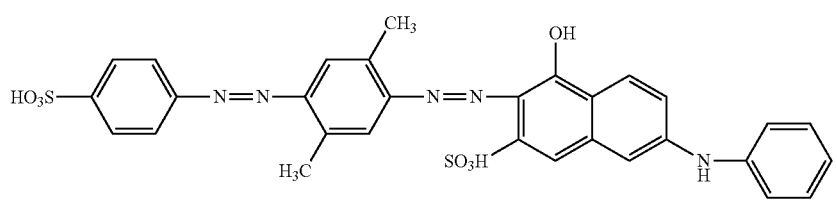

COMPOUND EXAMPLE 8
[Chemical formula 18]
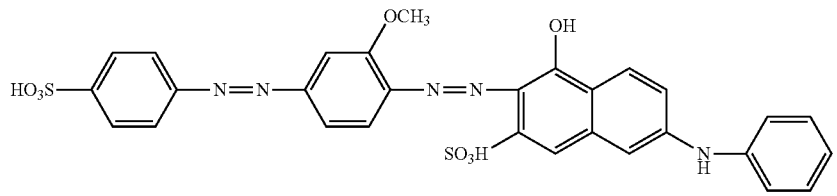
COMPOUND EXAMPLE 9
[Chemical formula 19]
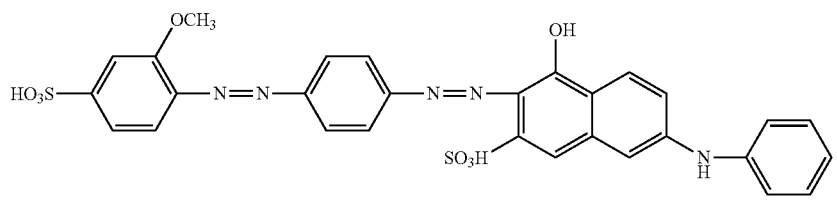
COMPOUND EXAMPLE 10
[Chemical formula 20]
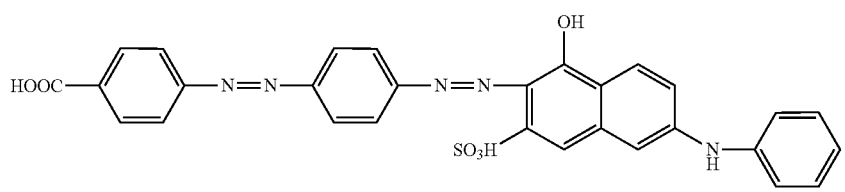
COMPOUND EXAMPLE 11
[Chemical formula 21]
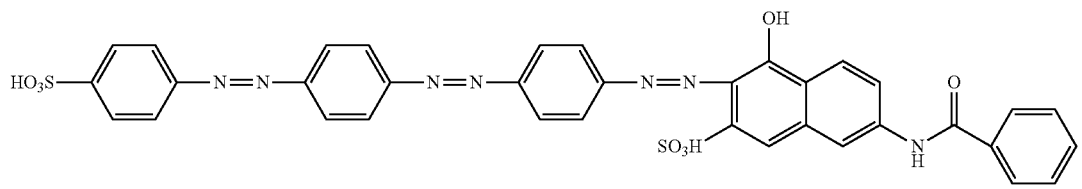
COMPOUND EXAMPLE 12
[Chemical formula 22]
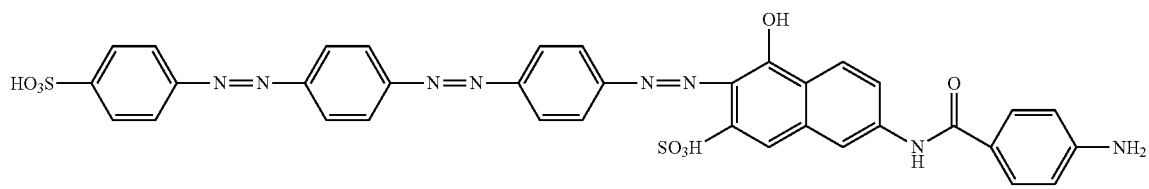

[Chemical formula 23]
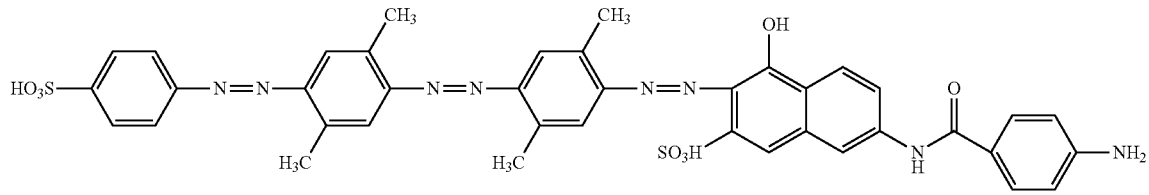
COMPOUND EXAMPLE 14
[Chemical formula 24]
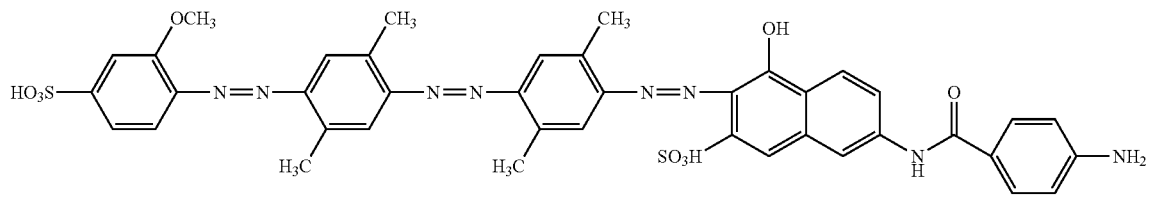
COMPOUND EXAMPLE 15
[Chemical formula 25]
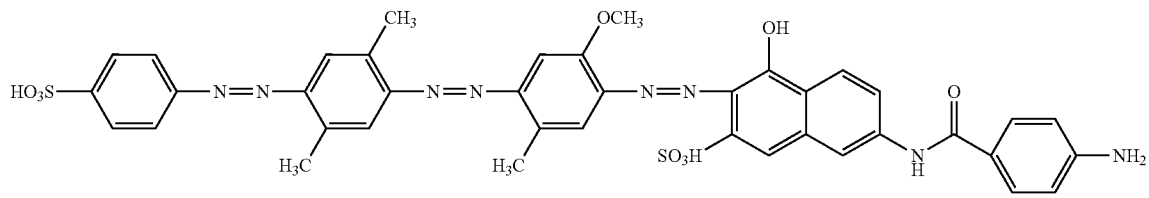
COMPOUND EXAMPLE 16
[Chemical formula 26]
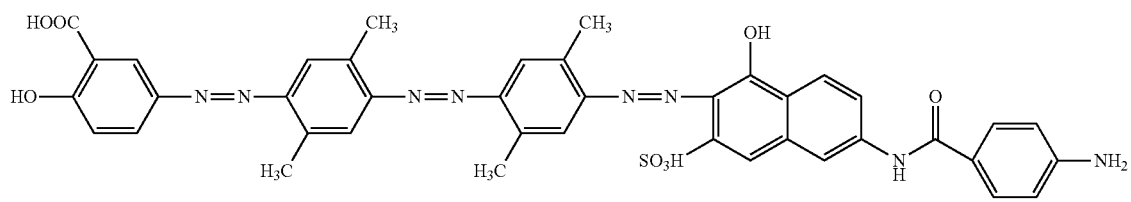
Next, more specific examples of azo compounds represented by formula (2) are given below, in the form of a free acid.

COMPOUND EXAMPLE 17
[Chemical formula 27]
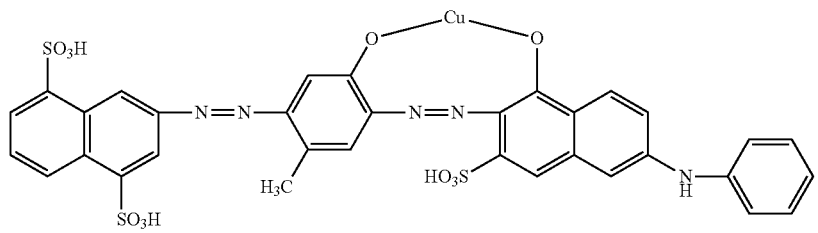
COMPOUND EXAMPLE 18
[Chemical formula 28]
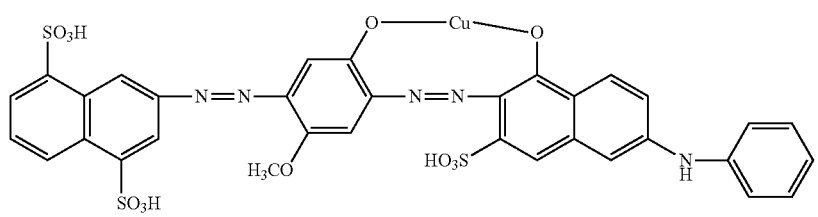
COMPOUND EXAMPLE 19
[Chemical formula 29]
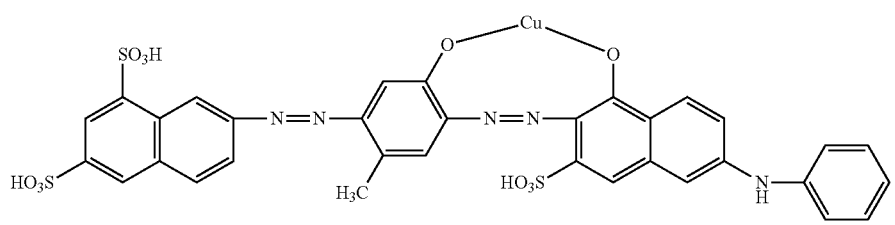
COMPOUND EXAMPLE 20
[Chemical formula 30]
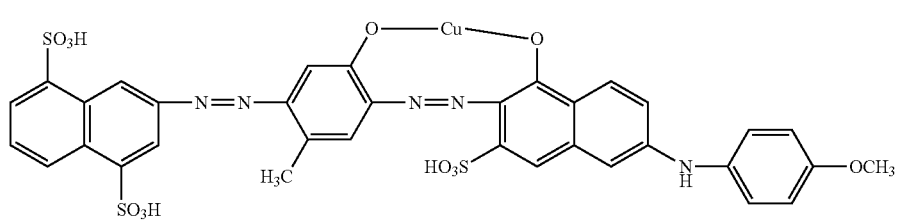

COMPOUND EXAMPLE 21
[Chemical formula 31]
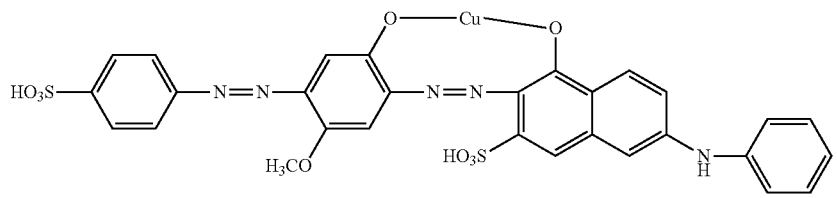
Next, more specific examples of azo compounds represented by formula (3) are given below, in the form of a free acid.
COMPOUND EXAMPLE 22
[Chemical formula 32]
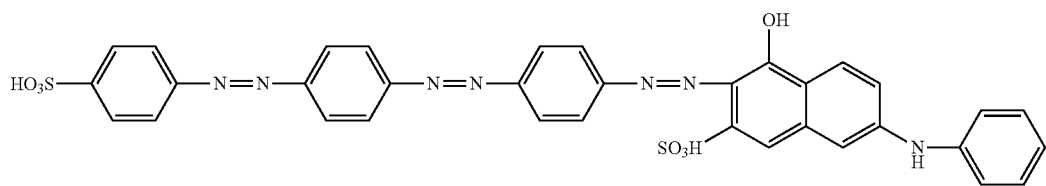
COMPOUND EXAMPLE 23
[Chemical formula 33]
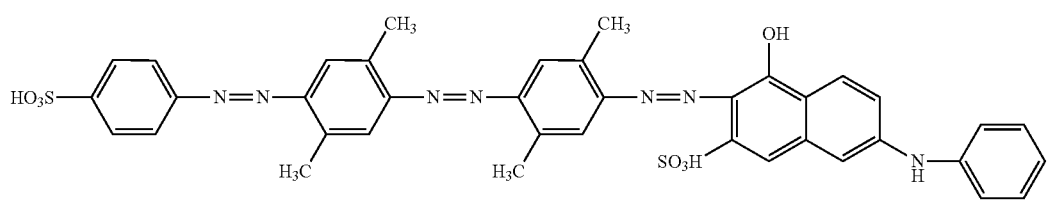
COMPOUND EXAMPLE 24
[Chemical formula 34]
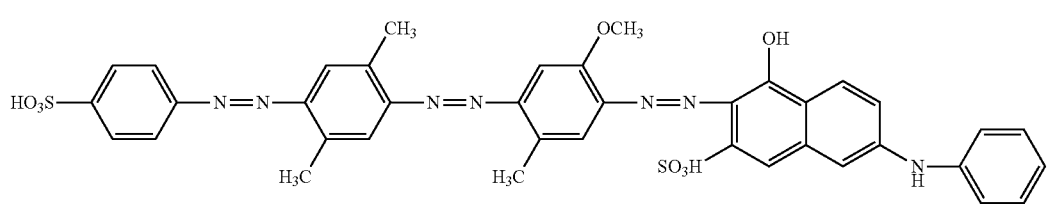

COMPOUND EXAMPLE 25
[Chemical formula 35]
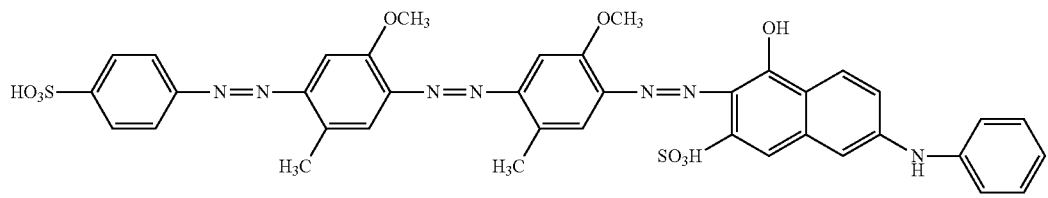
COMPOUND EXAMPLE 26
[Chemical formula 36]
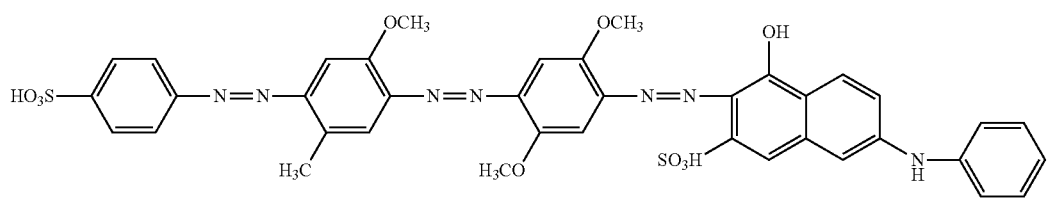
COMPOUND EXAMPLE 27
[Chemical formula 37]
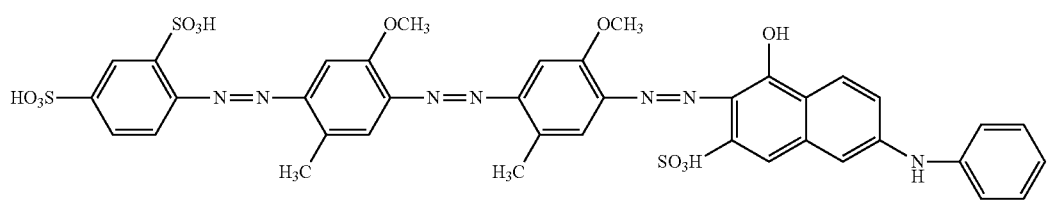
COMPOUND EXAMPLE 28
[Chemical formula 38]
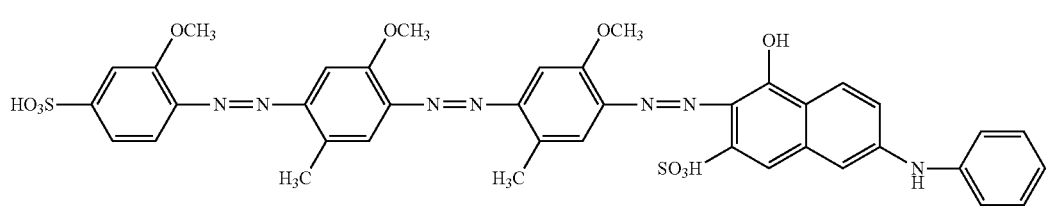

COMPOUND EXAMPLE 29

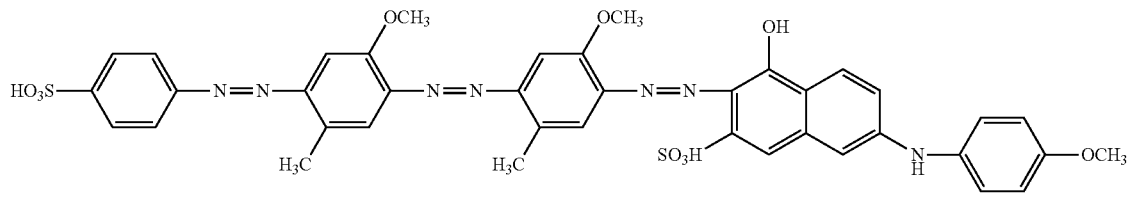

COMPOUND EXAMPLE 30

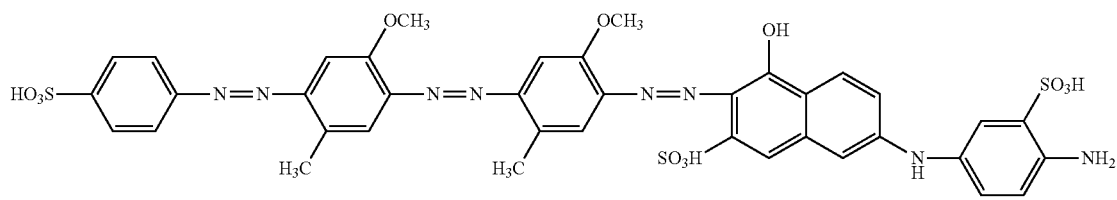

A specific example of a polarization element fabrication method is described below, taking an example of a polyvinyl alcohol resin film as the base material. There are no particular limitations as to the method for fabricating the polyvinyl alcohol resin film; known methods may be employed for fabrication. The fabrication method includes saponification of a polyvinyl acetate resin. Examples of the polyvinyl acetate resin include copolymers of vinyl acetate and other monomers copolymerizable therewith, and the like, in addition to polyvinyl, acetate composed of a homopolymer of vinyl acetate. Examples of other monomers for copolymerization with vinyl acetate may include unsaturated carboxylic acids, olefins, vinyl ethers, unsaturated sulfonic acids, and the like. The degree of saponification of the polyvinyl alcohol resin is normally on the order of 85-100 mol %, and is preferably 95 mol % or above. The polyvinyl alcohol resin may be further modified; for example, aldehyde-modified polyvinyl formal or polyvinyl acetal can be used as well. The degree of polymerization of the polyvinyl alcohol resin refers to the viscosity-average degree of polymerization, and can be calculated by methods widely known in the technical field. The degree of polymerization is typically about 1,000-10,000, and preferably about 1,500-6,000.

The film produced from the polyvinyl alcohol resin is employed as the original fabric film. There are no particular limitations as to the method for film production from the polyvinyl alcohol resin; widely known methods may be employed for film production. In this case, the polyvinyl alcohol resin film may contain plasticizers such as glycerin, ethylene glycol, propylene glycol, low-molecular weight polyethylene glycol, and the like. The amount of plasticizer is 5-20 wt %, preferably 8-15 wt %. There are no particular limitations as to the thickness or the original fabric film composed of the polyvinyl alcohol resin; the thickness may be, e.g., about 5 μm-150 μm, and preferably about 10 μm-100 μm.

The original fabric film obtained in the above manner is next subjected to a swelling step. For the swelling step, a process involving immersion for 30 seconds to 10 minutes in a solution at 20-50° C. is applied. Preferably, the solution is water. The stretching magnification may be adjusted to 1.00-1.50, and preferably 1.10-1.35. When a shorter time to fabricate the polarization element film is desired, the swelling step may be omitted, as swelling occurs during the pigment dyeing process as well.

The swelling step is carried out by immersing the polyvinyl alcohol resin film in a solution at 20-50° C. for 30 seconds to 10 minutes. Preferably, the solution is water. When a shorter time to fabricate the polarization element film is desired, the swelling step may be omitted, as swelling occurs during the pigment dyeing process as well.

After the swelling step, a dyeing step is carried out. In the dyeing step, dyeing can be carried out using iodine and a dichroic pigment such as those indicated in Non-Patent Reference 1, and the like. As the iodine those can be impregnated into the polyvinyl alcohol, resin film may be used; as the iodine impregnation method, a method involving impregnation with a solution of iodine or an iodide dissolved in water may be used. As iodides, for example, potassium iodide, ammonium iodide, cobalt iodide, or zinc iodide may be used, but are not limited to those indicated herein. The iodine concentration should be 0.0001 wt %-0.5 wt %, preferably 0.001 wt %-0.4 wt %; the iodide concentration is preferably 0.0001 wt %-8 wt %. With the azo compounds disclosed in Non-Patent Reference 1, and the azo compounds represented by formula (1), formula (2), and formula (3), the pigments can be adsorbed onto the polyvinyl alcohol film in the dyeing step. There are no particular limitations as to the dyeing step, provided that a method by which the dichroic pigment is adsorbed onto the polyvinyl alcohol film is employed; the dyeing step can be carried out, for example, by immersing the polyvinyl alcohol resin film in a solution containing the dichroic pigment. The solution temperature in this step is preferably 5-60° C., more preferably 20-50° C., and especially 35-50° C. The duration of immersion in the solution can be adjusted appropriately, and is preferably adjusted to from 30 seconds to 20 minutes, and more preferably 1-10 minutes. While the dyeing method preferably involves immersion in the solution, the process can also be carried out by applying the solution onto the polyvinyl alcohol resin film. The solution containing the dichroic pigment can contain, as dyeing aids, sodium carbonate, sodium hydrogen carbonate, sodium chloride, sodium sulfate, anhydrous sodium sulfate, sodium tripolyphosphate, and the like. The amounts thereof can be adjusted to any desired concentration according to time and temperature, which depend on the dyeing properties of the dichroic pigment; the respective amounts of each are preferably 0-5 wt %, more preferably 0.1-2 wt %. As to the order in which the iodine and the azo compound are included, while it acceptable to treat with both simultaneously, from the standpoint of productivity, dyeing bath management, and the like, the preferred dyeing method is one in which the azo compound is included after first including the iodine; even more preferred is a method in which the iodine is included after first including the azo compound. The azo compounds which are the dichroic dyes disclosed in Non-Patent Reference 1 may be used in the form of a free acid, or as salts of the compounds. As such salts, there can be employed lithium salts, sodium salts, potassium salts, or other alkali metal salts, and ammonium salts, alkylamine salts, or other organic salts. Sodium salts are preferred.

After the dyeing step, a washing step (hereinafter "washing step 1") can be carried out before proceeding to the next step. The washing step 1 is a step for washing away the dye solvent deposited on the surfaces of the polyvinyl alcohol resin film during the dyeing step. By carrying out the washing step 1, migration of dye into the liquid used in the next treatment can be minimized. In the washing step 1, water is typically employed. The preferred washing, method includes immersion in the solution, but washing can also be accomplished by applying the solution to the polyvinyl alcohol resin film. While there are no particular imitations as to the duration of washing, 1-300 seconds is preferred, and 1-60 seconds is more preferred. The temperature of the solvent in the washing step 1 must be a temperature such that the hydrophilic polymer does not dissolve. The washing process typically takes place at 5-4° C. However, as the absence of the washing step 1 does not pose any problems in terms of capabilities, this step can be omitted.

After she dyeing step or the washing step 1, a step for impregnating a crosslinking agent and/or a waterproofing agent can be carried out. As crosslinking agents, there can be employed, for example, boric acid, borax, ammonium borate, or other boron compounds; glyoxal, glutaraldehyde, or other polyvalent aldehydes; polyvalent isocyanate compounds of biuret type, isocyanurate type, blocked type, or the like; or titanium compounds such as titanium oxysulfate, or the like. Additionally, ethylene glycol glycsdyl ether, polyamide-epichlorohydrin, or the like can be employed. The waterproofing agent may include succinic peroxide, ammonium persulfate, calcium perchlorate, benzoin ethyl ether, ethylene glycol diglycidyl ether, glycerol diglycidyl ether, ammonium chloride, magnesium chloride, and the like; and boric acid is preferably used. The step for including crosslinking agents and/or waterproofing agents may be carried out using at least one or more types of the crosslinking agents and/or waterproofing agents indicated above. The solvent used at this time is preferably water, but is not limited thereto. The concentration of the crosslinking agent and/or waterproofing agent contained in the solvent in the step for including crosslinking agents and/or waterproofing agents, to take an example of boric acid, is preferably a concentration of 0.1-6.0 wt %, more preferably 1.0-4.0 wt %, with respect to the solvent. The solvent temperature in this step is preferably 5-70° C., more preferably 5-50° C. The preferred method for impregnating the crosslinking agent and/or waterproofing agent into the polyvinyl alcohol resin film involves immersion in the solution, but application or coating of the solution onto the polyvinyl alcohol resin film is acceptable as well. The treatment time in this step is preferably 30 seconds to 6 minutes, more preferably 1-5 minutes. However, impregnation by a crosslinking agent and/or waterproofing agent is not essential, and when it is desired to shorten the duration, or when crosslinking treatment or waterproofing treatment are unnecessary, this treatment step can be omitted.

After carrying out the dyeing step, the washing step 1, or the step for impregnating the crosslinking agent and/or waterproofing agent, a stretching step is carried out. The stretching step is a step for uniaxial stretching of the polyvinyl alcohol film. In the stretching method, either a wet stretching method or a dry stretching method may be employed. The present invention is realized by a stretching magnification of 3 times or greater. The stretching magnification is 3 times or greater, preferably 5 to 7 times.

In the case of a dry stretching method, when the heating medium for stretching is an air medium, the stretching preferably takes place at the temperature of the air medium of ordinary temperature to 180° C. The treatment preferably takes place in an atmosphere with humidity of 20-95% RH. The heating method may include an inter-roll zone stretching method, a roll-heated stretching method, a rolling stretching method, an infrared heated stretching method, and the like, but is not limited thereto. The stretching step may involve stretching in a single stage, or multi-stage stretching in two or more stages.

In the case of a wet stretching method, stretching takes place in water, a water-soluble organic solvent, or a mixed solvent thereof. The stretching process preferably takes place while immersed in a solution containing a crosslinking agent and/or a waterproofing agent. Examples of the crosslinking agent used herein may include boric acid, borax, ammonium borate, or other boron compounds; glyoxal, glutaraldehyde, or other polyvalent aldehydes; polyvalent isocyanate compounds of biuret type, isocyanurate type, blocked type, or the like; or titanium compounds such as titanium oxysulfate, or the like; additionally, ethylene glycol glycidyl ether, polyamide-epichlorohydrin, or the like can be also used. Examples of the waterproofing agent used herein include succinic peroxide, ammonium per sulfate, calcium perchlorate, benzoin ethyl ether, ethylene glycol diglycidyl ether, glycerol diglycidyl ether, ammonium chloride, magnesium chloride, and the like. Stretching is carried out in a solution containing at least one or more of the crosslinking agents and/or waterproofing agents indicated above. The crosslinking agent is preferably boric acid. The concentration of the crosslinking agent and/or waterproofing agent in the stretching step is preferably, e.g., 0.5-15 wt %, more preferably 2.0-8.0 wt %. The stretching magnification is preferably 2-8 times, more preferably 5-7 times. Treatment preferably takes place at a stretching temperature of 40-60° C., more preferably 45-58° C. The duration of stretching is normally 30 seconds to 20 minutes, more preferably 2-5 minutes. The dry stretching step may involve stretching in a single stage, or multi-stage stretching in two or more stages.

After carrying out the stretching step, precipitation of the crosslinking agent and/or waterproofing agent, or adhesion of foreign matter, to the film surfaces sometimes occur; therefore, a washing step (hereinafter "washing step 2") can be carried out to wash the film surfaces. The duration of washing is preferably 1 second to 5 minutes. The preferred washing method is immersion in a washing solution, but washing can be accomplished through application or coating of the solution onto the polyvinyl alcohol resin film as well. The washing process can take place in a single stage, or by a multi-stage process of two or more stages. There are no particular limitations as to the solution temperature in the washing step, but the temperature is normally 5-50° C., preferably 10-40° C.

Examples of the solvents employed in the process steps mentioned up to this point may include water, dimethyl sulfoxide, N-methylpyrrolidone, methanol, ethanol, propanol, isopropyl alcohol, glycerol, ethylene glycol, propylene glycol, diethylene glycol, triethylene glycol, tetraethylene glycol, trimethylol propane, and other alcohols, ethylenediamine, diethylenetriamine, or other amines, and other solvents. A single or a mixture of these solvents can be used. Water is the most preferred solvent.

After the stretching step or the washing step 2, a drying step of the film is carried out. The drying step may be carried out through natural drying; or, to enhance drying efficiency, compression by rollers, elimination of surface moisture by an air knife or water-absorbent roll, and/or forced air drying can be carried out. The drying treatment is preferably carried out at a drying temperature of 20-100° C., and more preferably by drying treatment at 60-100° C. The duration of the drying treatment can be 30 seconds to 20 minutes, and is preferably 5-10 minutes.

Through the above methods, there can be obtained a polarization element having single transmittance of 35% or above and a degree of polarization of 99% or above, a single body being a base material containing a dichroic dye composed of an azo compound, the polarization element characterized in that the a* value and the b* value calculated in accordance with JIS Z 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2.

The polarization element thus obtained is provided on one or both surfaces with a transparent protective film, to give a polarization plate. The transparent protective film may be provided as a coating polymer film, or as a film laminate layer. The transparent polymer or film forming the transparent protective film is preferably a transparent polymer or film of high mechanical strength and excellent thermal stability. Examples of the substances for use as the transparent protective film may include triacetyl cellulose, diacetyl cellulose, and other such cellulose acetate resins or films thereof; acrylic resins or films thereof; polyvinyl chloride resins or films thereof; nylon resins or films thereof; polyester resins or films thereof; polyarylate resins or films thereof; cyclic polyolefin resins of cyclic olefin monomers such as norbornene, or films thereof; polyethylene; polypropylene; polyolefins having a cyclo or norbornene skeleton, or copolymers thereof; resins or polymers having amide and/or imide main chains or side chains, or films thereof, and the like. A resin having liquid crystallinity, or a film thereof, can also be provided as the transparent protective film. The transparent protective film thickness is, for example, about 0.5 μm-200 μm. Polarization plates are fabricated by providing one or more layers of these resins or films of the same or different type, to one or both surfaces.

An adhesive is needed to adhere the transparent protective film to the polarization element. While there are no particular limitations as to the adhesive, polyvinyl alcohol adhesives are preferred. Non-limiting examples of polyvinyl alcohol adhesives include GOHSENOL NH-26 (Nippon Synthetic Chemical Industry Co. Ltd.), EXCEVAL PS-2117 (Kuraray Co. Ltd.), and the like. Crosslinking agents and/or waterproofing agents can be added to the adhesive. Where a maleic anhydride-isobutylene copolymer is employed as a polyvinyl alcohol adhesive, a crosslinking agent may be mixed with the adhesive, if needed, for use. Examples of maleic anhydride-isobutylene copolymers may include ISOBAM #18 (Kuraray Co. Ltd.), ISOBAM #04 (Kuraray Co. Ltd.), ammonia-modified ISOBAM #104 (Kuraray Co. Ltd.), ammonia-modified ISOBAM #110 (Kuraray Co. Ltd.), imidized ISOBAM #304 (Kuraray Co. Ltd.), imidized ISOBAM #310 (Kuraray Co. Ltd.), and the like. Water-soluble, polyvalent epoxy compounds can be employed as crosslinking agents in the process. Examples of water-soluble, polyvalent epoxy compounds may include DENA-GOL EX-521 (Nagase Chemtex Corp.), TETRAD-C (Mitsubishi Gas Chemical Company Inc.), and the like. As adhesives other than polyvinyl alcohol resins, widely known urethane based, acrylic based, or epoxy based adhesives can be used pith the aim of improving the adhesive strength or improving the water resistance of the adhesive, additives such as zinc compounds, chlorides, iodides, and the like may be included simultaneously, in concentrations of about 0.1-10 wt %. There are no particular limitations as to additives. Once the transparent protective film has been adhered using the adhesive, a polarization plate is obtained through drying or heat treatment, at appropriate temperature.

In some instances, in the case of adhesion to a display device of, for example, liquid crystal or organic electroluminescent type, or the like, the obtained polarization plate may be provided, on the surface of a protective layer or film subsequently serving as a non-exposed surface thereof, with layers of various functionalities for improving viewing angle and/or improving contrast, or with layers or films having luminance-improving properties. It is preferable to employ an adhesive when such a polarization plate is adhered to such a film or display device.

The polarization plate may also have on another surface thereof, i.e., on an exposed surface of the protective layer or film, an anti-reflection layer, an anti-glare layer, a hard coating layer, or other such widely known layers having various functionalities. While coating methods are the preferred method for fabrication of layers having various functionalities, films having such functions can be adhered via an adhesive or pressure-sensitive adhesive as well. The layers having various functionalities can also be layers or films for controlling phase differences.

Through the above methods, there can be obtained a polarization element and a polarization plate having a single transmittance of 35% or above, characterized in that the a* value and the b* value calculated in accordance with JIS Z 8729 are such that the absolute values of the a* value and the b* value when single transmittance is measured are no more than 1, the absolute values of the a* value and the b* value measured with two of the base materials being arranged in parallel with respect to the direction of the absorption axis are no more than 2, the absolute values of the a* value and the b* value measured with two of the base materials being arranged orthogonally with respect to the direction of the absorption axis are no more than 2. Liquid crystal display devices employing the polarization element or polarization plate of the present invention have high reliability, as well as long-lasting high contrast and high color reproduction.

The polarization elements or polarization plates of the present invention thus obtained may be provided, as needed, with a protective layer, or a functional layer and a support, or the like, and used in a liquid crystal projector, electronic calculator, clock, notebook PC, word processors, LCD TV, polarized lens, polarized glasses, car navigation unit, indoor/outdoor measuring instruments and indicators, or she like. In particular, the polarization elements or polarization plates may be utilized effectively in reflective liquid crystal display devices, semi-transmissive liquid crystal display devices, organic electroluminescent displays, and the like.

As one method of application, the polarization plate of the present invention may be used as a support-equipped polarization plate. The support is preferably one having a flat surface portion for the purpose of adhesion of the polarization plate. Moreover, as the intended purpose is for optical applications, molded glass components are preferred. Examples of the molded glass components may include glass sheets, lenses, prisms (e.g., triangular prisms or cubic prisms), and the like. A lens having an adhered polarization plate may be utilized as a polarization plate-equipped condenser lens, in a liquid crystal projector. A prism having an adhered polarization plate may be utilized as a polarization plate-equipped polarizing beam splitter, or as a polarization plate-equipped dichroic prism, in a liquid crystal projector. Adhesion to liquid crystal cells is also acceptable. Examples of the materials for the glass may include soda glass, borosilicate glass, inorganic bases of crystal, inorganic bases of sapphire, and other such inorganic glass, or sheets of acrylic, polycarbonate or other organic plastics; however, inorganic glass is preferred. The thickness and size of the glass sheet may be of the desired size. Glass-equipped polarization plates are preferably provided, on the glass surface or polarization surface thereof, or both, with an AR layer in order so further improve she single-plate light transmittance. A transparent adhesive (pressure-sensitive adhesive) is applied, for example, to the flat portion of such a support, and the polarization plate of the present invention is then adhered to this coated surface. Alternatively, an adhesive (pressure-sensitive adhesive) is applied to the polarization plate, and the support is then adhered to this coated surface. The transparent adhesive (pressure-sensitive adhesive) used here is preferably an acrylic acid ester based adhesive. Where the polarization plate is to be used as an elliptical polarization plate, a retardation plate side is normally adhered to the support side, but it is also acceptable that the polarization plate side is adhered to the molded glass component.

EXAMPLES

The present invention is described in further detail below through examples; however, the invention is not limited by these examples. The transmittance indicated in the examples was evaluated as follows.

The transmittance observed during measurement of a single polarization element or polarization plate is designated as transmittance Ts, the transmittance observed when two polarization elements or polarization plates are stacked with the absorption axis directions thereof aligned is designated as parallel transmittance Tp, and the transmittance observed when two polarization elements or polarization plates are stacked with the absorption axis directions thereof orthogonal is designated as orthogonal transmittance Tc.

The single transmittance Ys is computed according to the following formula (6), by calculating the spectral transmittance τλ at prescribed wavelength intervals dλ (here, 10 nm) in the 400 nm-700 nm wavelength region. In the formula, PA represents a spectral distribution of a standard illuminant (C illuminant), and yλ represents a two degree visual field color matching function.

[Numerical formula 1]

$$Y_S = \frac{\int_{400}^{700} P\lambda \cdot y\lambda \cdot \tau\lambda \cdot d\lambda}{\int_{400}^{700} P\lambda \cdot y\lambda \cdot d\lambda}$$

Formula (6)

The spectral transmittance τλ was measured using a spectrophotometer (U-4100 manufactured by Hitachi Ltd.).

The degree of polarization ρy was calculated from the parallel transmittance Tp and the orthogonal parallel transmittance Tc, using formula (7).

[Numerical formula 2]

$$\rho y = \{(Tp-Tc)/(Tp+Tc)\}^{1/2} \times 100$$

Formula (7)

Further, the transmittance during irradiation with absolutely-polarized light was measured using a spectrophotometer (U-4100 manufactured by Hitachi Ltd.). When measuring transmittance, an iodine type polarization plate (SKN-18043P manufactured by Polatechno Co. Ltd.) having a degree of polarization of 99.99% and transmittance of 43% subsequent to luminosity factor correction was positioned at the light exit side based on JIS Z 8729 (C illuminant, two degree visual field), so that absolutely-polarized light being incident on the measured specimen. The protective layer of the iodine type polarization plate was triacetyl cellulose lacking a UV absorbing function.

Where Ky denotes the absolute parallel transmittance at individual wavelengths, obtained with absolutely-polarized light being incident on the polarization plate of the present invention, through measurements taken when the vibration direction of the absolutely-polarized light positioned and the absorption axis direction of the polarization plate of the present invention are orthogonal to one another (when the absorption axis of the absolutely-polarized light and the absorption axis of the polarization plate of the present invention are parallel), and Kz denotes the absolute orthogonal transmittance at individual wavelengths, obtained through measurements taken when the vibration direction of the absolutely-polarized light and the absorption axis direction of the polarization plate of the present invention are parallel to one another (when the absorption axis of the absolutely-polarized light and the absorption axis of she polarization plate of the present invention are orthogonal), Ky and Kz were measured at individual wavelengths.

Example 1

A polyvinyl, alcohol film (VF-XS manufactured by Kuraray Co. Ltd.) having a saponification of 99% or greater and an average degree of polymerization of 2,400 was subjected to swelling treatment by immersion for two minutes in 45° C. hot water, at a stretching magnification of 1.30 times. The film having undergone swelling treatment was immersed for 3 minutes and 30 seconds in an aqueous solution adjusted to 45° C., containing 1,500 weight parts of water, 1.5 weight part of sodium tripolyphosphate, 0.2 weight part of C. I. Direct Red 81 having the structure of formula (1), and 0.27 weight part of Example 1 of Japanese Examined. Patent Application 64-5623 having the structure of formula (2). The resulting film was immersed for two minutes at 30° C. in an aqueous solution containing 28.6 g/L of boric acid (manufactured by Societa Chimica Larderello s.p.a), 0.25 of iodine (manufactured by Junsei Chemical Co. Ltd.), 17.7 g/L of potassium iodide (manufactured by Junsei Chemical Co. Ltd.), and 1.0 g/L of ammonium iodide (manufactured by Junsei Chemical Co. Ltd.), and iodine/iodide treatment was carried out. The film obtained by dyeing was stretched for 5 minutes with a 50° C. aqueous solution containing 30.0 g/L of boric acid, she film being stretched at a stretching magnification of 5.0 times. The film obtained through boric acid treatment, while maintained in a tensioned state, was treated for 20 seconds in an aqueous solution adjusted to a potassium iodide content of 20 g/L, while held at 30° C. The treated film was subjected to a 9-minute drying treatment at 70° C., to obtain a polarization element according to the present invention. Using a polyvinyl alcohol based adhesive, the dried polarization element was laminated with an alkali-treated triacetyl cellulose film (TD-80U manufactured by Fuji Photographic Film Co. Ltd.), to obtain a polarization plate.

The obtained, polarization plate was cut into 40 mm×40 mm pieces, and adhered to a 1 mm glass sheet with the pressure-sensitive adhesive PTR-3000 (manufactured by Nippon. Kayaku Co. Ltd.), to produce specimens for measurement.

Example 2

Except that 0.2 weight part of C.I. Direct Red 117, an azo compound having the structure of formula (1) was used instead of the 0.2 weight part of C.I. Direct Red 81 disclosed in Example 1, a polarization element and a polarization plate were fabricated and measurement samples were obtained in accordance with the same manner as above.

Example 3

Except that 0.14 weight part of a dye having the structure of formula (1) disclosed in Example 1 of Japanese Patent Publication 4033443 was used instead of the 0.2 weight parts of C.I. Direct Red 81 disclosed in Example 1, a polarization element and a polarization plate were fabricated and measurement samples were obtained in the same manner as above.

Example 4

Except that 0.18 weight part of a dye having the structure of formula (1) disclosed in Synthesis Example 1 of Japanese Patent Application 4162334 was used instead of the 0.2 weight parts of C.I. Direct Red 81 disclosed in Example 1, a polarization element and a polarization plate were fabricated and measurement samples were obtained in the same manner as above.

Example 5

Except that 0.3 weight part of an azo compound having the structure of formula (2) disclosed in Example 4 of Japanese. Examined Patent Application 64-5623 was used instead of the 0.27 weight parts of the compound of Example 1 of Japanese Examined Patent Application 61-5623 having the structure of formula (2) employed in Example 3, a polarization element and a polarization plate were fabricated and measurement samples were obtained in the same manner as above.

Example 6

Except that 0.3 weight part of an azo compound having the structure of formula (3) disclosed in Example 1 of Japanese. Patent Publication 2622748 was used instead of the 0.27 weight parts of the compound of Example 1 of Japanese Examined Patent Application 64-5623 having the structure of formula (2) employed in Example 3, a polarization element and a polarization plate were fabricated and measurement samples were obtained in the same manner as above.

Example 7

Except that a polyvinyl alcohol film (VF-XH manufactured by Kuraray Co. Ltd.) having an average degree of polymerization of 4,000 was used instead of the polyvinyl alcohol film (VF-XS manufactured by Kuraray Co. Ltd.) having saponification of 99% or greater and an average degree of polymerization of 2,400 in Example 3, a polarization element and a polarization plate were fabricated and measurement samples were obtained in the same manner as above Example 3.

Comparative Example 1

Measurement samples were prepared in the same manner as in Example 1, except that an iodine based polarization plate not containing an azo compound was produced in accordance with the formulation of Comparative Example 1 of Japanese Laid-Open Patent Application 2008-065222.

Comparative Example 2

Except that a polarization element containing an azo compound only as dye was prepared in accordance with the method of Example 1 of Japanese Laid-Open Patent Application 11-218611, in which a polarization film of neutral color is disclosed, a polarization plate was fabricated and measurement samples were obtained in the same manner as in Example 1.

Comparative Example 3

Except that a dye based polarization element, containing an azo compound only as dye was prepared in accordance with the method of Example 3 of Japanese Patent Publication 4162334, a polarization plate was fabricated and measurement samples were obtained in the same manner as in Example 1.

Comparative Example 4

An SHC-125 super contrast polarization plate of neutral color manufactured by Polatechno Co. Ltd. was subjected to the measurement.

The results of measuring Ys, ρy, a*-s, b*-s, a*-p, b*-p, a*-c, and b*-c in Examples 1 to 7 and Comparative Examples 1 to 4 are shown in Table 1.

TABLE 1

|  | Ys | ρy | a*-s | b*-s | a*-p | b*-p | a*-c | b*-c | Avg. transmittance at 410-750 nm | Color in a parallel arrangement | Color in an orthogonal arrangement |
|---|---|---|---|---|---|---|---|---|---|---|---|
| Ex. 1 | 39.31 | 99.99 | −0.60 | 0.92 | −0.18 | 1.80 | 0.09 | −0.40 | 40.38 | white | black |
| Ex. 2 | 39.13 | 99.99 | −0.60 | 0.89 | −0.09 | 1.60 | 0.18 | −0.32 | 40.12 | white | black |
| Ex. 3 | 39.43 | 99.99 | 0.01 | 0.48 | 0.09 | 0.92 | 0.50 | −0.92 | 40.60 | white | black |
| Ex. 4 | 40.00 | 99.99 | −0.33 | 0.50 | −0.57 | 1.05 | 0.94 | −1.15 | 41.07 | white | black |
| Ex. 5 | 39.66 | 99.99 | 0.27 | 0.42 | 0.56 | 0.83 | 0.63 | −0.98 | 40.86 | white | black |
| Ex. 6 | 41.24 | 99.99 | −0.56 | 0.58 | −1.00 | 1.15 | 0.74 | −1.40 | 40.83 | white | black |
| Ex. 7 | 40.94 | 99.99 | 0.11 | 0.18 | 0.07 | 0.87 | 0.61 | −0.93 | 41.57 | white | black |
| Cmp. Ex. 1 | 41.43 | 99.99 | −1.93 | 4.34 | −3.22 | 7.78 | 0 | −0.02 | 41.27 | yellow-green | black |
| Cmp. Ex. 2 | 39.36 | 99.74 | −0.59 | 3.94 | −0.89 | 7.06 | 0.10 | 0.09 | 40.08 | yellow | black |
| Cmp. Ex. 3 | 39.76 | 99.89 | −1.76 | 3.91 | −3.04 | 7.06 | 0.58 | −1.30 | 39.65 | yellow-green | black |
| Cmp. Ex. 4 | 39.54 | 99.75 | −0.31 | 3.38 | −0.37 | 6.14 | 0.07 | 0.07 | 40.08 | yellow | black |

Table 2 shows the average transmittance at 400 nm to 460 nm, the average transmittance at 550 nm to 600 nm, the average transmittance at 600 nm to 670 nm, the absolute value of the difference between the average transmittance at 400 nm to 460 nm and average transmittance at 550 nm to 600 nm, and the absolute value of the difference between the average transmittance 550 nm to 600 nm and the average transmittance at 600 nm to 670 nm in Examples 1 to 7 and Comparative Examples 1 to 4, when absolutely-polarized light was incident.

arranged orthogonally with respect to the direction of the absorption axis are no more than 2. Further, the polarization element or polarization plate can provide achromatic white and black being displayed in cases of parallel white display and orthogonal black display, respectively. From the average transmittance at 410 to 750 nm, it may be appreciated that the transmittance is higher than the polarization plate of approximately 31 to 32% disclosed in Example 1 or 2 of Japanese Patent Publication 3357803. When the average transmittance was over 40%, the L value was also over 70.

TABLE 2

|  | Avg. transmittance at 400-460 nm | | Avg. transmittance at 550-600 nm | | Avg. transmittance at 600-670 nm | | Absolute value of difference between avg. transmittance at 400-460 nm and avg. transmittance at 550-600 nm | | Absolute value of difference between avg. transmittance at 550-600 nm and avg. transmittance at 600-670 nm | |
|---|---|---|---|---|---|---|---|---|---|---|
|  | parallel arrangement | orthogonal arrangement | parallel arrangement | orthogonal arrangement | parallel arrangement | orthogonal arrangement | parallel arrangement | orthogonal arrangement | parallel arrangement | orthogonal arrangement |
| Ex. 1 | 72.91 | 0.0635 | 76.88 | 0.0233 | 79.65 | 0.0021 | 3.97 | 0.0401 | 2.77 | 0.0212 |
| Ex. 2 | 73.84 | 0.0677 | 77.73 | 0.0015 | 79.54 | 0.0018 | 3.90 | 0.0662 | 1.81 | 0.0003 |
| Ex. 3 | 75.46 | 0.1727 | 78.42 | 0.0003 | 80.75 | 0.0009 | 2.96 | 0.1724 | 2.33 | 0.0006 |
| Ex. 4 | 76.61 | 0.3052 | 79.54 | 0.0006 | 81.30 | 0.0012 | 2.94 | 0.3046 | 1.75 | 0.0006 |
| Ex. 5 | 76.09 | 0.2148 | 78.98 | 0.0002 | 81.50 | 0.0008 | 2.89 | 0.2146 | 2.52 | 0.0006 |
| Ex. 6 | 76.94 | 0.2476 | 80.10 | 0.0011 | 81.61 | 0.0020 | 3.15 | 0.2465 | 1.52 | 0.0009 |
| Ex. 7 | 77.87 | 0.1754 | 80.61 | 0.0003 | 82.89 | 0.0009 | 2.75 | 0.1751 | 2.28 | 0.0005 |
| Cmp. Ex. 1 | 64.23 | 0.0257 | 82.40 | 0.0100 | 83.49 | 0.0073 | 18.17 | 0.0157 | 1.10 | 0.0027 |
| Cmp. Ex. 2 | 71.94 | 0.1467 | 80.08 | 0.1075 | 80.75 | 0.1166 | 8.14 | 0.0392 | 0.67 | 0.0091 |
| Cmp. Ex. 3 | 64.49 | 0.1392 | 79.72 | 0.0076 | 80.57 | 0.1814 | 15.24 | 0.1316 | 0.85 | 0.1739 |
| Cmp. Ex. 4 | 72.09 | 0.1231 | 80.21 | 0.1068 | 80.76 | 0.1029 | 8.12 | 0.0163 | 0.55 | 0.0039 |

As may be appreciated from the measured values of Ys, ρy, a*-s, b*-s, a*-p, b*-p, a*-c, and b*-c in Examples 1 to 7 and Comparative Examples 1 to 4 of Table 1, according to the present invention, there is provided a polarization element or polarization plate having a single transmittance of 35% or above, characterized in that the A* value and the b* value calculated in accordance with JIS Z 8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being Thus, a highly satisfactory polarization element has been obtained. Moreover, from the transmittance at individual wavelengths, it will be appreciated that with this polarization plate, the transmittance at individual wavelengths measured during irradiation by polarized light, the vibration direction of the absolutely polarized form of which being the orthogonal direction to the absorption axis direction of the base material polarization element, is adjusted such that the difference between the average transmittance at 550 nm to 600 nm and at 400 to 460 nm is no more than 4%, while the difference between the average transmittance at 600 nm to 670 nm and average transmittance at 550 nm to 600 nm is no more than 3%; and the transmittance at individual wavelengths measured during irradiation by polarized light, the vibration direction of the absolutely polarized form of which being the parallel direction to the absorption axis direction of the base material polarization element, is adjusted such that the difference between the average transmittance at 550 nm to 600 nm and at 400 to 460 nm is no more than 1%, and the difference between average transmittance at 600 nm to 670 nm and average transmittance at 550 nm to 600 nm to no more than 1%. The resultant polarization plates are capable of expressing achromatic white when the absorption axis of the polarization element is arranged in parallel, and capable of expressing achromatic black when the absorption axis of the polarization element is arranged orthogonally, while at the same time having high transmittance. Additionally, liquid crystal display devices employing the polarization element or polarization plate of the present invention not only have high luminance and high contrast, but also high reliability, as well as long-lasting high contras and high color reproduction.

The invention claimed is:

1. A polarization element comprising a stretched base material containing iodine and a dichroic dye that is an azo compound and having a polarizing function, wherein the polarization element is characterized in that:
   a* value and b* value of hue calculated in accordance with JIS Z 8729 are such that absolute values of the a* value and the b* value when single-body transmittance is measured are no more than 1, absolute values of the a* value and the b* value measured with two of the base materials being arranged in parallel with respect to an absorption axis direction are no more than 2, and absolute values of the a* value and the b* value measured with two of the base materials being arranged orthogonally with respect to the absorption axis direction are no more than 2; and
   the single-body transmittance is 35% or above, and
   wherein said polarization element comprises a plurality of azo compounds, and wherein the plurality of azo compounds comprises, an azo compound represented in a form of a free acid by formula (1) and an azo compound represented in a form of a free acid by formula (2); or an azo compound represented in a form of a free acid by formula (1) and an azo compound represented in a form of a free acid by formula (3):

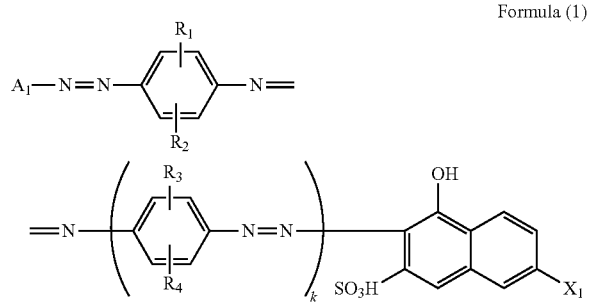

Formula (1)

(wherein $A_1$ represents a phenyl group or naphthyl group having a substituent group; $R_1$ to $R_4$ each independently represent a hydrogen atom, a lower alkyl group, a lower alkoxy group, a sulfo group, or a lower alkoxy group having a sulfo group; $X_1$ represents an amino group optionally having a substituent group, a benzoylamino group optionally having a substituent group, a phenylamino group optionally having a substituent group, or a phenylazo group optionally having a substituent group; k represents an integer of 0 or 1; and when k is 1, $X_1$ represents a benzoylamino group optionally having a substituent group);

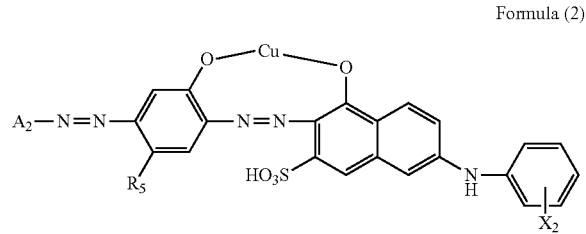

Formula (2)

(wherein $A_2$ represents a phenyl group or naphthyl group having a substituent group; $R_5$ represents a hydrogen atom, a lower alkyl group, a lower alkoxy group, a sulfo group, or a lower alkoxy group having a sulfo group; and $X_2$ represents a hydrogen atom, a lower alkyl group, or a lower alkoxyl group);

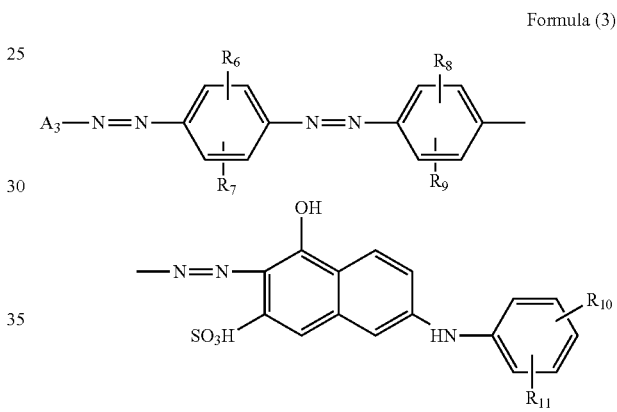

Formula (3)

(wherein $A_3$ represents a phenyl group having a substituent group; $R_6$ to $R_9$ each independently represent a hydrogen atom, a lower alkyl group, a lower alkoxy group, a sulfo group, or a lower alkoxy group having a sulfo group; and $R_{10}$ and $R_{11}$ each independently represent a hydrogen atom, a methyl group, a methoxy group, a sulfo group, an amino group, or a substituted amino group, with the proviso that all of $R_6$ to $R_9$ do not represent a lower alkoxy group simultaneously.

2. The polarization element according to claim 1, characterized in that a polarization degree is 99% or above.

3. The polarization element according to claim 1, characterized in that:
   transmittance of individual wavelengths during irradiation with polarized light, an absolutely polarized form of which having a vibration direction orthogonal to the absorption axis direction of a base material polarization element, is such that difference between average transmittance at 550 nm to 600 nm and average transmittance at 400 nm to 460 nm is no more than 4%, and difference between average transmittance at 600 nm to 670 nm and average transmittance at 550 nm to 600 nm is no more than 3%; and
   transmittance of individual wavelengths during irradiation with polarized light, an absolutely polarized form of which having a vibration direction parallel to the absorption axis direction of the base material polarization element, is such that difference between average transmittance at 550 nm to 600 nm and average transmittance at 400 nm to 460 nm is no more than 1%, and difference between average transmittance at 600 nm to 670 nm and average transmittance at 550 nm to 600 nm is no more than 1%.

4. The polarization element according to claim 1, characterized in that $X_1$ of formula (1) is represented by formula (4):

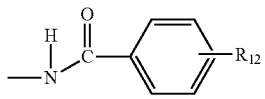

Formula (4)

(wherein $R_{12}$ represents a hydrogen atom, a methyl group, a methoxy group, a sulfo group, or an amino group).

5. The polarization element according to claim 1, characterized in that $X_1$ of formula (1) is represented by formula (5):

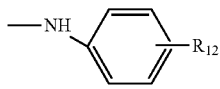

Formula (5)

(wherein $R_{13}$ represents a hydrogen atom, a methyl group, a methoxy group, a sulfo group, or an amino group).

6. The polarization element according to claim 1, characterized in that $R_5$ of formula (2) is a methyl group or a methoxy group.

7. The polarization element according to claim 1, characterized in that $A_2$ of formula (2) is a naphthyl group having a substituent group.

8. The polarization element according to claim 7, characterized in that $X_2$ of formula (2) is a hydrogen atom, a methyl group, or a methoxy group.

9. The polarization element according to claim 1, characterized in that at least one of $R_8$ and $R_9$ of formula (3) is a methoxy group.

10. The polarization element according to claim 1, characterized in that at least one of $R_6$ and $R_7$ of formula (3) is a methoxy group.

11. The polarization element according to claim 1, characterized in that the base material comprises a polyvinyl alcohol resin film.

12. A polarization plate comprising a support film furnished to at least one surface of the polarization element according to claim 1.

13. A liquid crystal display device comprising the polarization element according to claim 1.

14. A liquid crystal display device comprising the polarization plate according to claim 12.

* * * * *